United States Patent
Ren et al.

(10) Patent No.: US 12,279,050 B2
(45) Date of Patent: Apr. 15, 2025

(54) PHASE-DETECTION IMAGE SENSOR REMOSAICING

(71) Applicant: OmniVision Technologies, Inc., Santa Clara, CA (US)

(72) Inventors: Yiyi Ren, Cupertino, CA (US); Wenshou Chen, Santa Clara, CA (US); Lei Fan, Santa Clara, CA (US); Nian Xiong, Santa Clara, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 118 days.

(21) Appl. No.: 18/323,173

(22) Filed: May 24, 2023

(65) Prior Publication Data
US 2024/0397211 A1    Nov. 28, 2024

(51) Int. Cl.
*H04N 23/84*    (2023.01)
*H04N 25/704*    (2023.01)

(52) U.S. Cl.
CPC ......... *H04N 23/843* (2023.01); *H04N 25/704* (2023.01)

(58) Field of Classification Search
CPC ............................ H04N 23/843; H04N 25/704
USPC ....................................................... 348/342
See application file for complete search history.

(56) References Cited

U.S. PATENT DOCUMENTS

| | | | |
|---|---|---|---|
| 9,179,113 B2 | 11/2015 | Tachi | |
| 10,853,913 B2 | 12/2020 | Chuang et al. | |
| 1,145,535 A1 | 8/2022 | Woods | |
| 2003/0063201 A1* | 4/2003 | Hunter | H04N 25/134 348/241 |
| 2021/0217134 A1* | 7/2021 | Okamura | H04N 23/88 |
| 2023/0247318 A1* | 8/2023 | Jang | H04N 25/134 348/241 |
| 2024/0056694 A1* | 2/2024 | Ozone | H04N 25/704 |

* cited by examiner

*Primary Examiner* — Lin Ye
*Assistant Examiner* — Chan T Nguyen

(57) ABSTRACT

An imaging system comprising a phase-detection image sensor comprising a plurality of phase-detection pixel units and a processor configured to: interpolate a green image to obtain a full resolution interpolated green image including defocused portions having artifacts and in-focus portions having sharp image, low-pass filter the full resolution interpolated green image to obtain a blurred image of the interpolated green image, combine the full resolution interpolated green image and the blurred image of the full resolution interpolated green image to obtain a corrected full resolution interpolated green image, where the artifacts of the defocused portions of the full resolution interpolated green image are removed, and the sharp image of the in-focus portions of the full resolution interpolated green image is unaffected.

26 Claims, 11 Drawing Sheets

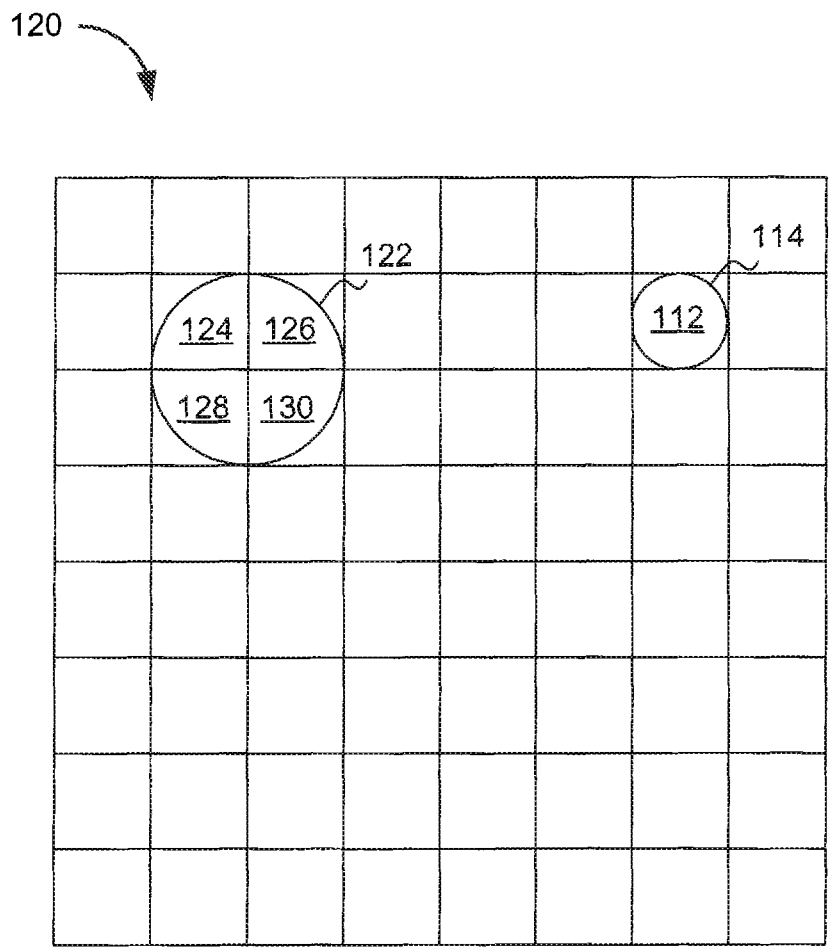
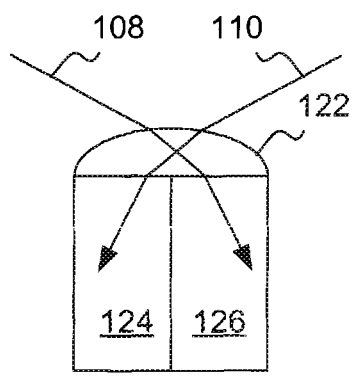
Fig. 1C
Fig. 1D

Red

Green

Blue

Red

Green

Blue

Red

Green

Blue

PHASE-DETECTION IMAGE SENSOR REMOSAICING

FIELD OF THE INVENTION

This disclosure relates to phase-detection image sensor, and particularly phase-detection image sensors remosaicing.

BACKGROUND OF THE INVENTION

The vast majority of electronic cameras have autofocus capability. Recently, phase-detection autofocus (PDAF) has gained popularity. The autofocus function automatically focuses the camera on objects in the scene viewed by the camera. Autofocus may be fully automatic such that the camera identifies objects in the scene and focuses on the objects. In some cases, the camera may even decide which objects are more important than other objects and subsequently focus on the more important objects. Alternatively, autofocus may utilize user input specifying which portion or portions of the scene are of interest. Based thereupon, the autofocus function identifies objects within the portion or portions of the scene, specified by the user, and focuses the camera on such objects. These functions are realized by PDAF.

After autofocusing, e.g., using PDAF, a captured image generally have in-focus portions and defocused portions, because not all portions of the image are at the same distance from the camera. If a phase-detection (PD) image sensor is used to perform PDAF, the defocused portions may generate artifacts. If the artifacts of the defocused portions are removed using low-pass filtering, the in-focus portions may be affected and become blur. Accordingly, a PD image sensor that can present unaffected in-focus portions and defocused portions having artifacts removed, is demanded.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1C shows a pixel array comprising a plurality of PD pixels and a plurality of microlenses covering PD pixels.

FIG. 1D shows a cross-section of microlens covering first left PD pixel and first right PD pixel.

Figure 1A:
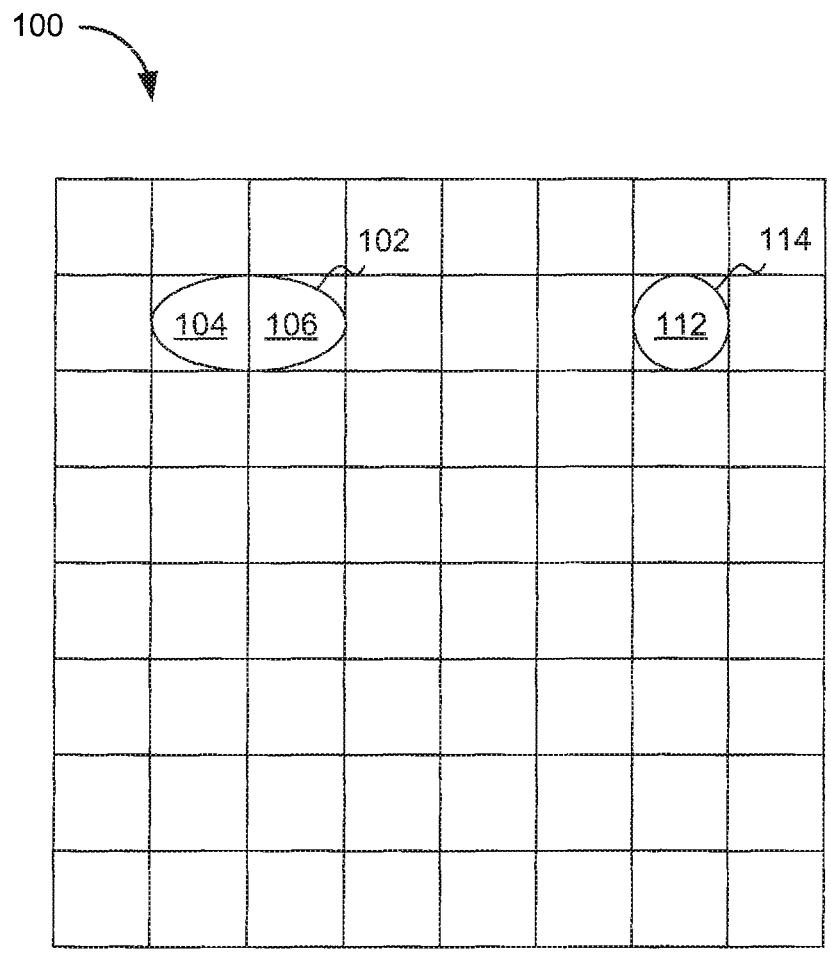
FIG. 1A shows a pixel array of a PD image sensor having PDAF capability.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

FIG. 1A shows a pixel array 100 of a phase-detection (PD) image sensor having PDAF capability. In an embodiment, two pixels, e.g., left phase-detection (PD) pixel and right PD pixel, are covered by a microlens. The phase difference between the left PD pixel and the right PD pixel is detected to perform autofocus. Pixel array 100 comprises a plurality of PD pixels, a microlens 102 covers a left PD pixel 104 and a right PD pixel 106. PD pixels 104 and 106 form a PD pixel unit. Pixel array 100 may also include a plurality of image pixels 112. Each image pixel has a microlens 114. An image pixel cannot function as a PD pixel, but a PD pixel can function as an image pixel.

Figure 1B:
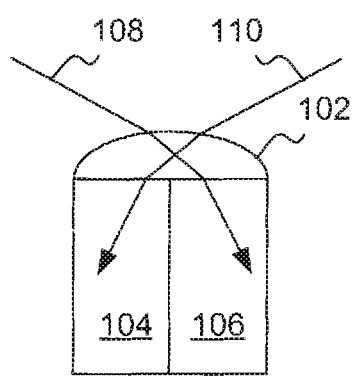
FIG. 1B shows a cross-section of microlens covering left PD pixel and right PD pixel.

FIG. 1B shows a cross-section of microlens 102 covering left PD pixel 104 and right PD pixel 106. Light 108 coming from left side in a camera (not shown) is incident at microlens 102 and is directed to right PD pixel 106. Light 110 coming from right side in the camera (not shown) is incident at microlens 102 and is directed to left PD pixel 104. Left PD pixel 104 detects a left image of a PD image, which is the image detected by the PD image sensor. Right PD pixel 106 detects a right image of the PD image. PD pixels 104 and 106 may be recognized as a first left PD pixel and a first right PD pixel, respectively In an embodiment, four pixels are covered by a microlens as shown in FIG. 1C. FIG. 1C shows a pixel array 120 comprises a plurality of PD pixels and a plurality of microlenses covering PD pixels. A microlens 122 covers an upper left PD pixel 124, an upper right PD pixel 126, a lower left PD pixel 128, and a lower right PD pixel 130. PD pixels 124, 126, 128, and 130 form a PD pixel unit. Pixel array 120 may also include a plurality of image pixels 112. Each image pixel has a microlens 114. An image pixel cannot function as a PD pixel, but a PD pixel can function as an image pixel.

A one-dimensional cross-section of microlens 122 covering PD pixels 124, 126, 128, and 130 is shown in FIG. 1D. FIG. 1D is similar to FIG. 1B, where microlens 102 is replaced by microlens 122, PD pixel 104 is replaced by PD pixel 124, and PD pixel 106 is replaced by PD pixel 126. PD pixels 128 and 130 are not shown in the cross-section. PD pixels 124, 126, 128, and 130 may be recognized as a first left PD pixel, a first right PD pixel, a second left PD pixel, and a second right PD pixel, respectively.

Figure 2A:
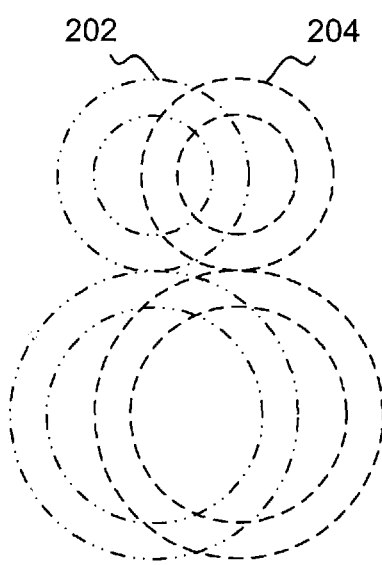
FIG. 2A shows left image separated from right image to left.
Figure 2B:
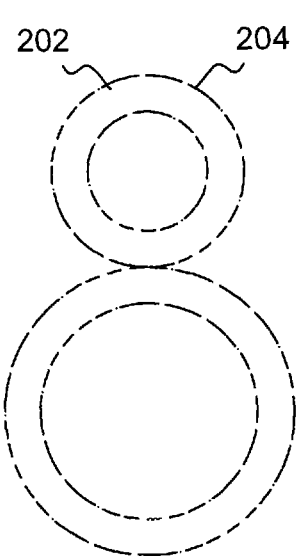
FIG. 2B shows left image overlapping with right image.
Figure 2C:
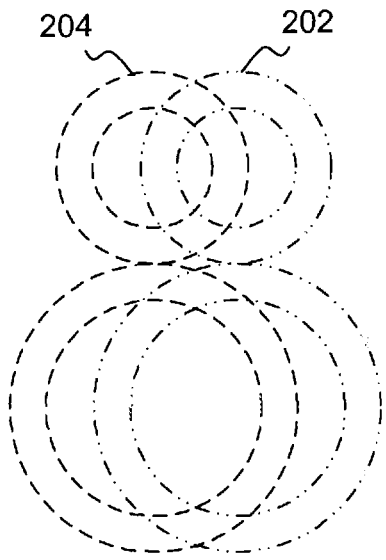
FIG. 2C shows left image separated from right image to right.

FIGS. 2A-2C show a left image of PD image and a right image of PD image formed by left PD pixels and right PD pixels, respectively. The PD image is referred to as the image detected by a PD image sensor prior to any processing. A PD image has a left image and a right image. FIG. 2A shows a left image 202 separated from a right image 204 to left, when the PD image is defocused, e.g., front defocused. FIG. 2B shows left image 202 overlapping with right image 204, when the image is in focus. FIG. 2C shows left image 202 separated from right image 204 to right, when the PD image is defocused, e.g., back defocused. An imaging lens of the camera (not shown) is moved to achieve one as shown in FIG. 2B, that is left image 202 overlapping with right image 204. However, since not all objects captured in the PD image have the same distance from the camera, some portions of the PD image may be in focus, and some portions of the PD image may be defocused.

Figure 3A:
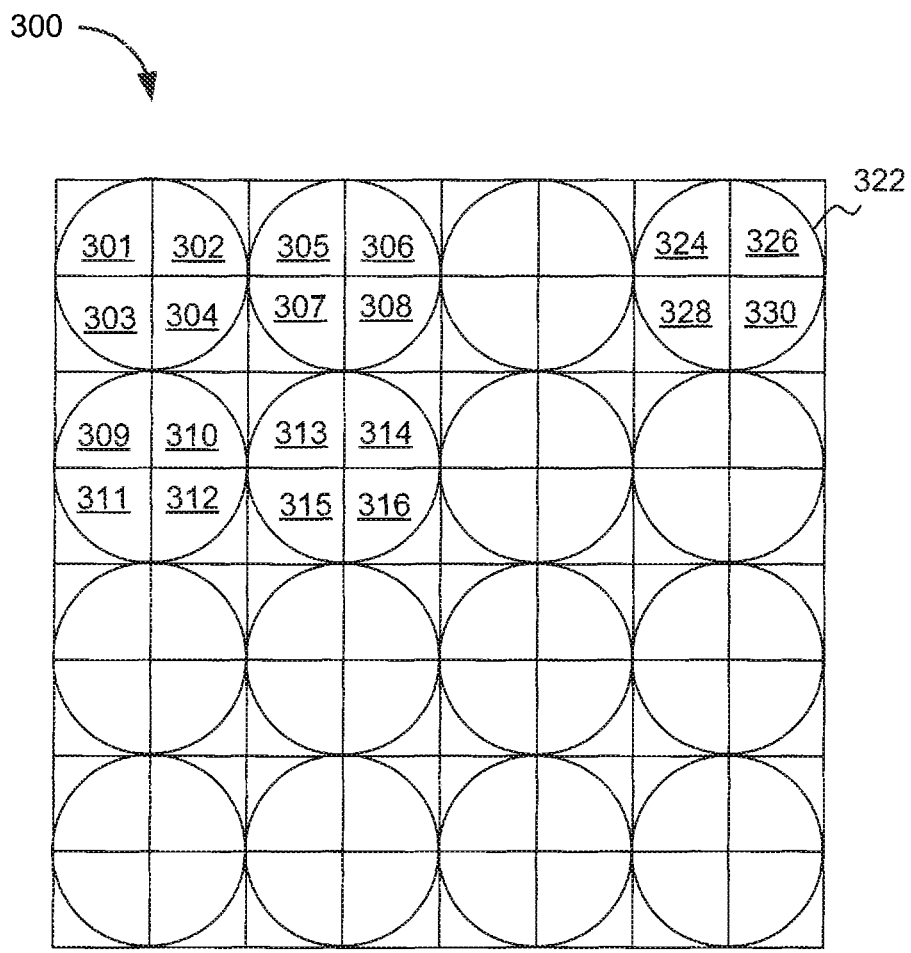
FIG. 3A shows a pixel array comprising a plurality of PD pixels and a plurality of microlens covering PD pixels.
Figure 3B:
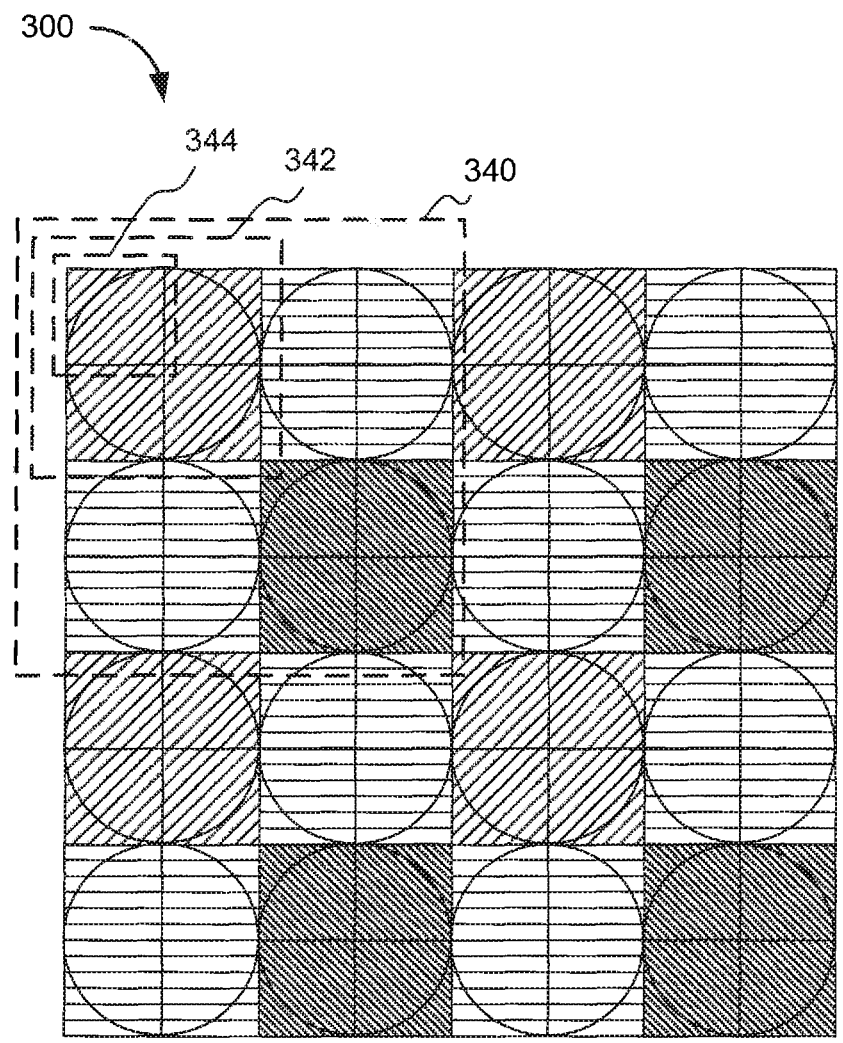
FIG. 3B shows a group of four pixels of one color.
Figure 3B:
Figure 3B:
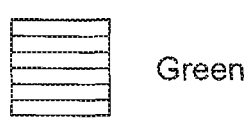
Figure 3B:
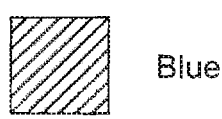

In an embodiment, all pixels of a pixel array may be PD pixels. In the embodiment, every four pixels may be covered by a microlens as shown in FIGS. 3A and 3B. FIG. 3A shows a pixel array 300 comprising a plurality of PD pixels and a plurality of microlens covering PD pixels. A microlens 322 covers four PD pixels, e.g., pixels 324, 326, 328, and 330. For example, PD pixels 301, 302, 303, and 304 may be blue pixels. PD pixels 305, 306, 307, and 308 may be green pixels. PD pixels 309, 310, 311, and 312 may be also green pixels. PD pixels 313, 314, 315, and 316 may be red pixels. FIG. 3B shows pixel array 300 to better show the distribution of color pixels. It is appreciated that other distributions of color pixels are also possible.

In the embodiment shown in FIG. 3A, pixels 324, 326, 328 and 330 do not only function as PD pixels, but they also function as image pixels as well. Also, all pixels in pixel array 300 shown in FIG. 3B function as PD pixels as well as image pixels. They function as PD pixels when the phase difference between a pair of pixels that are covered by the same microlens is determined. They function as image pixels when they are read individually to form a PD image.

Figure 4:
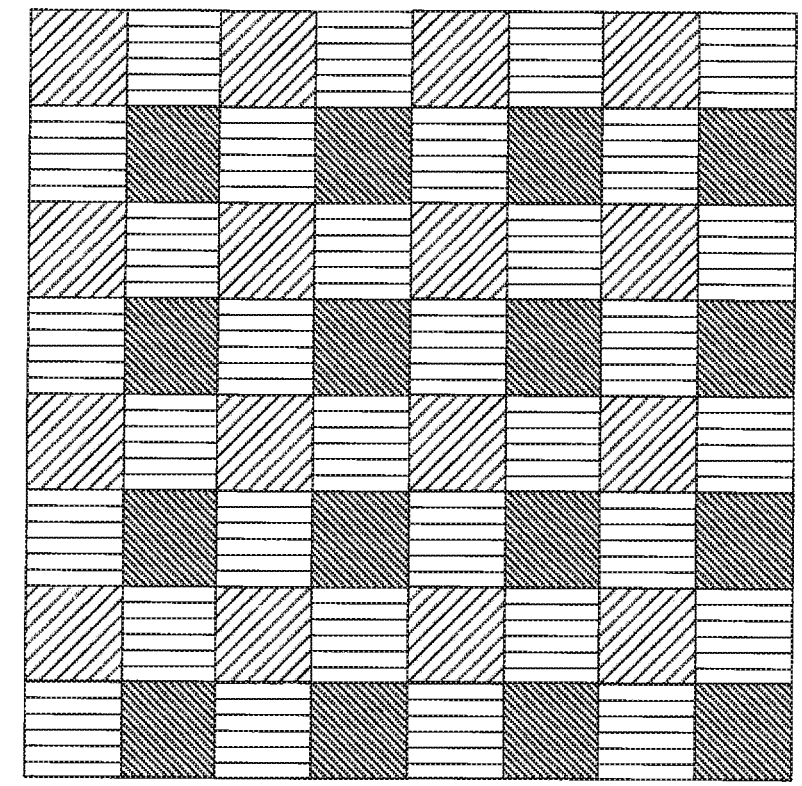
FIG. 4 shows a Bayer pattern composed by each individual pixel of PD image sensor.
Figure 4:
Figure 4:
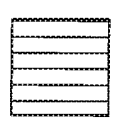
Figure 4:
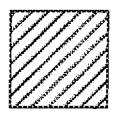

FIG. 3B shows that a group of four pixels is of one color. Furthermore, FIG. 3B shows a Bayer pattern 340 having 2×2 super pixels. Each super pixel, e.g., super pixel 342, consisting of 2×2 pixels, e.g., pixel 344 (which is a PD pixel as well as an image pixel), of the PD image sensor. To enhance the resolution of the PD image as detected by the PD image sensor, pixels included in a super pixel, are redistributed to from a Bayer pattern 400 composed by each individual pixel of the PD image sensor as shown in FIG. 4. It is important to note that Bayer pattern 400 is not a physical pixel array. In contrast, pixel array 300 is a physical pixel array. This process is known as remosaicing Bayer image. The remosaiced Bayer image, which is Bayer pattern 400, has a green image, a blue image, and a red image. The remosaiced Bayer image has doubled resolution in x and y directions as compared with the image of Bayer pattern 340 having super pixels of FIG. 3B.

Figure 5:
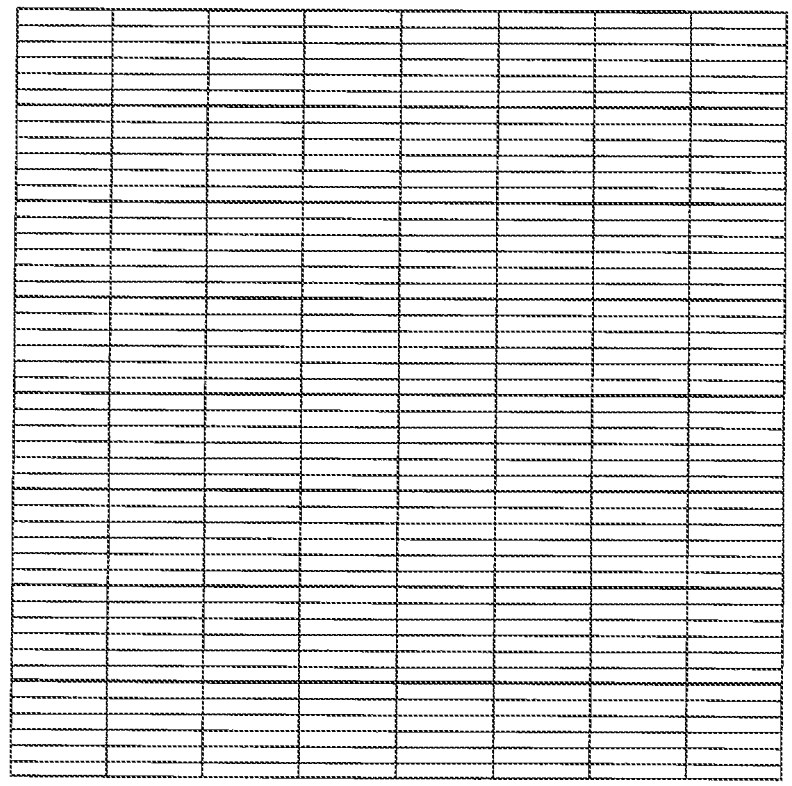
FIG. 5 shows a full resolution interpolated green image having no missing green pixels.
Figure 5:
Figure 5:
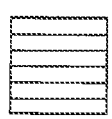
Figure 5:
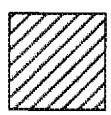

In remosaicing Bayer image, a green image is first interpolated, e.g., from Bayer pattern 340 of FIG. 3B, to obtain an interpolated green image in full resolution. Full resolution interpolated green image is referred to as a green image 500 having no missing green pixels as shown in FIG. 5.

A PD image captured by a PD image sensor comprising pixel array 300 of FIGS. 3A-3B may have some portions in focus, and some portions defocused. Referring back to FIGS. 1D, in the in-focus portions, left PD pixel 124 and right PD pixel 126 of a PD pixel unit detect the same light intensity, because left image 202 of PD image are overlapping with right image 204 of PD image as shown in FIG. 2B.

However, in the defocused portions, left PD pixel 124 and right PD pixel 126 detect different light intensities, because left image 202 of PD image is shifted away from right image 204 of PD image as shown in FIG. 2A or FIG. 2C. A left pixel of a PD pixel unit is next to a right pixel of the same PD pixel unit. Therefore, in the defocused portions, two neighboring pixels, e.g., left and right PD pixels, have different intensities. This generates artifacts in the captured PD image.

Interpolation algorithms for red, green, and blue images are available. They are not discussed in detail here, since they are not essential to the present invention. In this disclosure, it is understood that a full resolution interpolated green image is obtained or is already obtained. The full resolution interpolated green image includes defocused portions having artifacts and in-focus portions having sharp image. Then using the disclosed method of the present invention, the full resolution interpolated green image is corrected by removing the artifacts but keeping the sharp image. The corrected full resolution interpolated green image is then used to remosaic Bayer image with artifacts removed and unaffected sharp image.

Figure 6A:
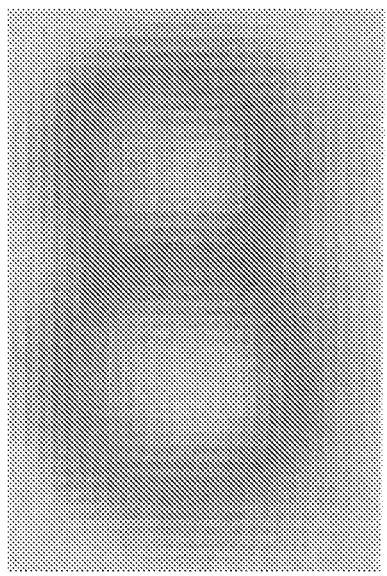
FIG. 6A shows a defocused portion of an interpolated green image.
Figure 6B:
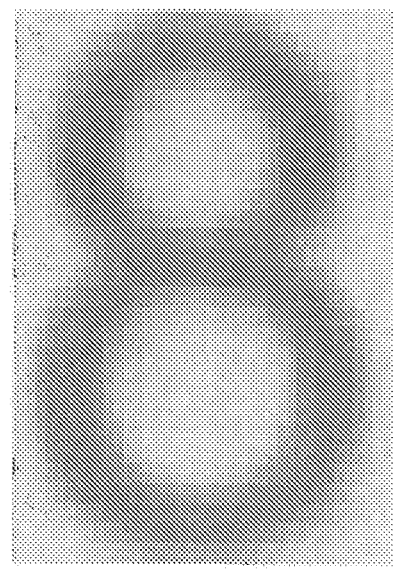
FIG. 6B shows an in-focus portion of a full resolution interpolated green image.

FIG. 6A shows a defocused portion of the full resolution interpolated green image. In this example, the whole FIG. 6A is the defocused image. The defocused portion shows artifacts in the image. Simply speaking, the artifact appears as a white pixel between two black pixels. For example, the white pixel is a left PD pixel of a PD pixel unit, and the black pixels are a right PD pixel of the same PD pixel unit and a right PD pixel of the neighboring PD pixel unit. For comparison, FIG. 6B shows an in-focus portion of the full resolution interpolated green image, which shows sharp image. In this example, the whole FIG. 6B is the in-focus image. No artifact appears in the in-focus portion as shown in FIG. 6B.

The artifacts in the defocused portion shown in FIG. 6A may be simply removed using a low-pass filter. However, the low-pass filter will blur the sharp image in the in-focus portion shown in FIG. 6B, at the same time the artifact being removed.

Figure 7:
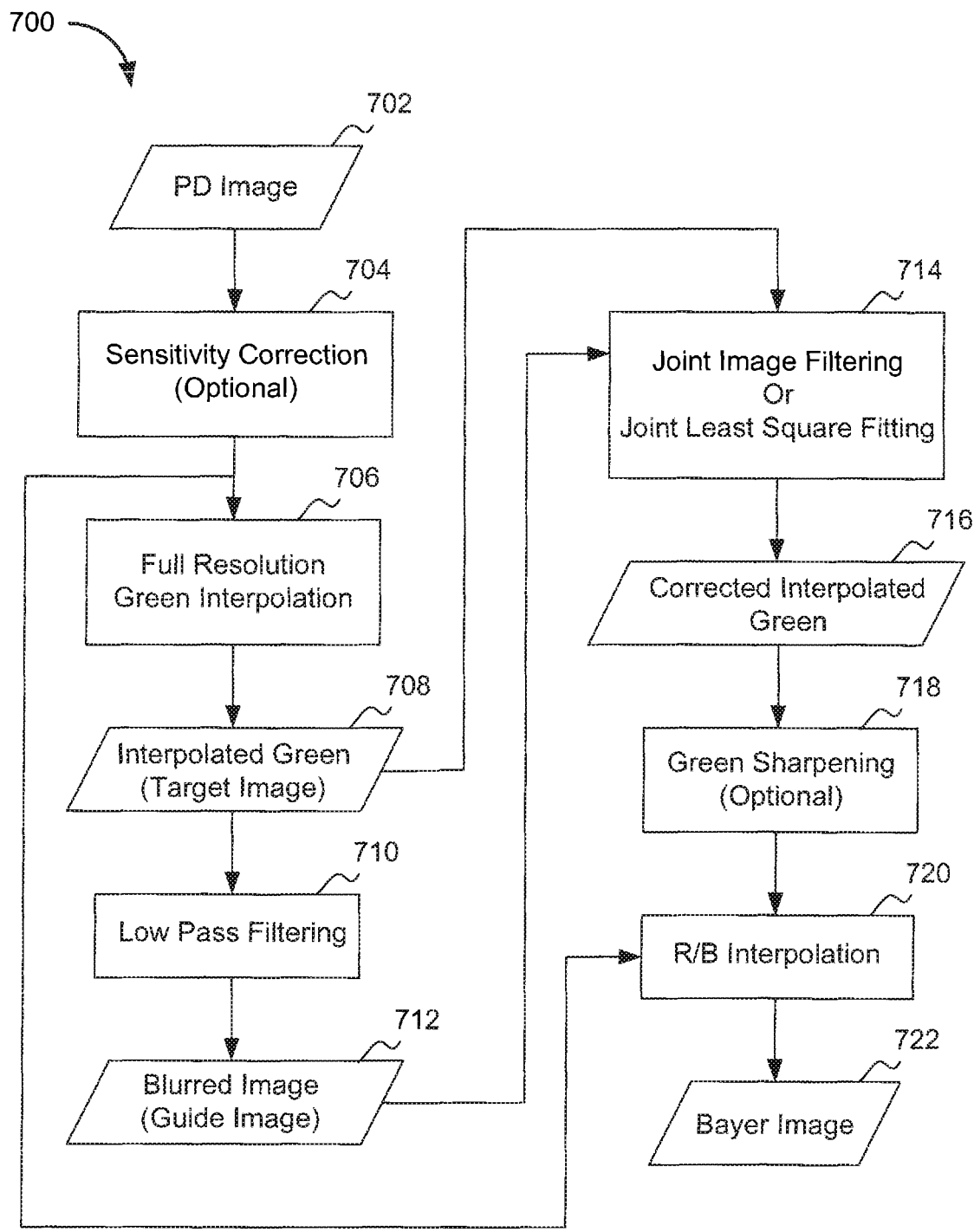
FIG. 7 is a remosaicing method, in accordance with the present invention.

To remove the artifacts in the defocused portions but keep the sharp image in the in-focus portions, a remosaicing method 700 is disclosed as shown in FIG. 7, in accordance with the present invention. Block 702 indicates a PD image, for example, which is provided by a PD image sensor having pixel array 300 shown in FIG. 3B. Block 704 shows an optional step, which is sensitivity correction.

Referring back to FIG. 1D, ideally, light 108 coming from left side is directed to right PD pixel 126, and light 110 coming from right side is directed to left PD pixel 124. However, light 108 may be partially deflected to left PD pixel 124, and light 110 may be partially deflected to right PD pixel 126. To minimize the effect of light 108 on left PD pixel 104 and light 110 on right PD pixel 106, sensitivity correction 704 may be carried out. The sensitivities of green, blue, and red images may be corrected. Block 704 may produce sensitivity corrected green, blue, and red images.

Block 706 shows the process of obtaining full resolution interpolated green image from the PD image of block 702. A variety of algorithm are available. They are not discussed in detail here, since they are not essential to the present invention. Block 708 shows a full resolution interpolated green image after the full resolution green interpolation of block 706 is completed. The full resolution interpolated green image includes portions having artifacts and portions having sharp image. Block 710 shows a low-pass filtering process.

Block 712 shows a blurred image after the low-pass filtering of block 710 is completed. The artifacts of the full resolution interpolated green image of block 708 has been removed, but the sharp image in the full resolution interpolated green image of block 708 becomes blur.

Block 714 shows a joint image filtering process or a joint least square fitting process. Joint image filtering and/or joint least square fitting involve jointly the full resolution interpolated green image of block 708 and the blurred image of block 712. The full resolution interpolated green image of block 706 and the blurred image of block 712 are combined or joined in this process.

Block 716 shows a corrected full resolution interpolated green image after joint image filtering or joint least square fitting process of block 714. The artifacts in the full resolution interpolated green image of block 708 have been removed, and the sharp image in the full resolution interpolated green image of block 708 is unaffected. Block 718 shows an optional step, which is green image sharpening. In this block, the corrected full resolution interpolated green image of block 716 may be further sharpened. Various sharpening algorithms are available including a high-pass filtering.

Block 720 shows red and blue interpolation partially based on the corrected full resolution interpolated green image of block 716 or its sharpened image of block 718. It is appreciated that the interpolation of block 720 is not for producing full resolution interpolated red and blue images. Instead, it is for producing a Bayer image, which is shown as Bayer pattern 400 of FIG. 4. A Bayer image comprises a green image having missing green pixels (missing two pixels in a Bayer pattern), a blue image having missing blue pixels (missing three pixels in a Bayer pattern), and a red image having missing red pixels (missing three pixels in a Bayer pattern). In contrast, a full resolution interpolated image has no missing pixel. Block 722 shows a remosaiced Bayer image following remosaicing method 700. A remosaiced Bayer image is formed using the interpolated blue and red images of block 720 and part of the corrected interpolated green image of block 716.

In block 720, red and blue images are interpolated partially based on the corrected full resolution interpolated green image of block 716 or its sharpened image of block 718, and. partially based on the color image arranged in the original Bayer pattern, which is PD image shown in block 702, if block 704 is skipped. If block 704 is not skipped, red and blue images are interpolated partially based on the sensitivity corrected green, blue, and red images produced at block 704 instead of the PD image of block 702.

Remosaicing method 700 may be performed by a processor of an imaging system. The imaging system comprises a PD image sensor comprising a plurality of PD pixel units, each PD pixel unit comprising a first left PD pixel and a first right PD pixel, the first left PD pixel and the first right PD pixel covered by a microlens. The plurality of PD pixel units comprise green PD pixel units forming a green image, blue PD pixel units forming a blue image, and red PD pixel units forming a red image. The green image, the blue image, and the red image form a color image arranged in an original Bayer pattern comprising green PD pixel units, blue PD pixel units, and red PD pixel units, which is PD image shown in block 702.

Remosaicing method 700 may be performed by a processor of an imaging system. The imaging system comprises a plurality of green pixel units, where a microlens covers each unit and each unit has four pixels, as shown in FIGS. 3A and 3B, a plurality of blue pixel units, where a microlens covers each unit and each unit has four pixels, and a plurality of red pixel units, where a microlens covers each unit and each unit has four pixels. The plurality of green pixel units form a green image, the plurality of blue pixel units form a blue image, and the plurality red pixel units form a red image. The green image, the blue image, and red image form a color image arranged in an original Bayer pattern comprising green pixel units, blue pixel units, and red pixel units, which is an image similar to PD image shown in block 702. In this embodiment, the pixel unit is not a PD pixel unit, meaning no phase difference between two pixels is detected.

In an embodiment, a microlens covers a pixel unit, and the pixel units may have 2×2, 4×4, 8×8, or 16×16 pixels. In principle, a pixel unit may have m×m pixels, where m is any integer.

Figure 8:
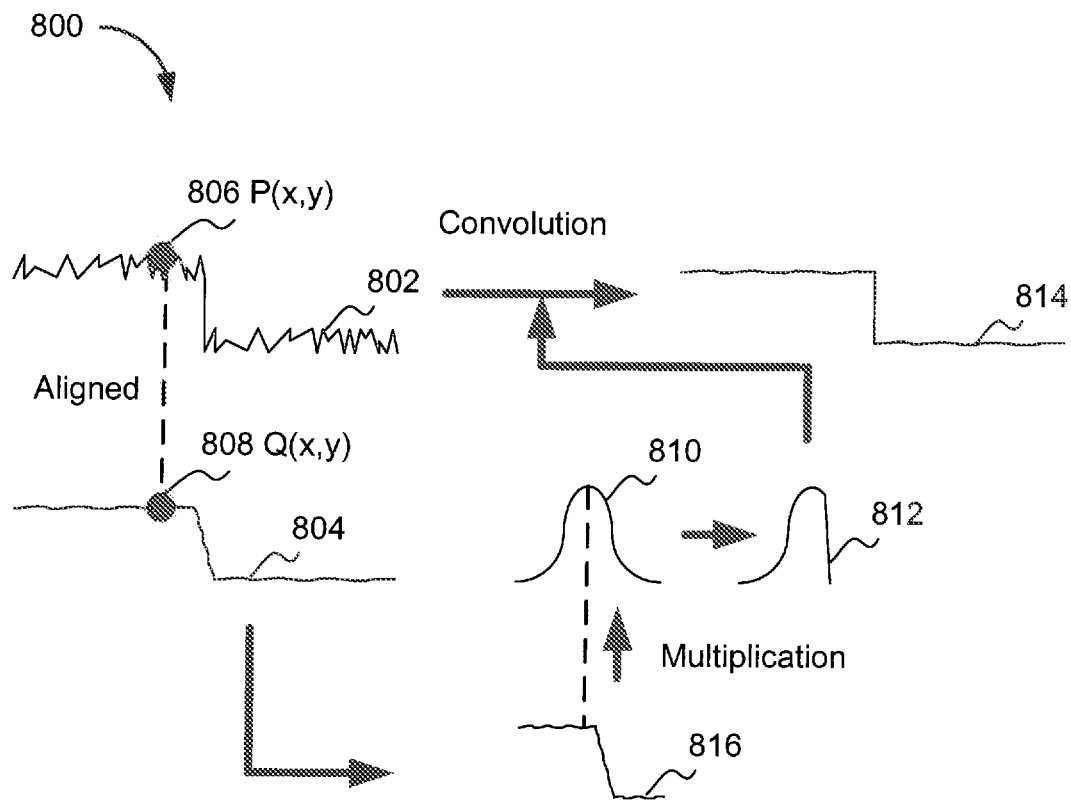
FIG. 8 shows a joint image filtering process, in accordance with the present invention.

FIG. 8 shows a joint image filtering process 800, which is shown as block 714 in FIG. 7, in accordance with the present invention. A full resolution interpolated green image 802, which is also shown in block 708 in FIG. 7, is a target image, which is spatial-variant convoluted with a bilateral kernel 812, resulting in a corrected full resolution interpolated green image 814, which is also shown as block 716 in FIG. 7. Bilateral kernel 812 is a joint bilateral function.

A blurred image 804, which is also shown as block 712 in FIG. 7, is used to generate a range kernel 816. For example, blurred image 804 may be a low-pass filtered image of full resolution interpolated green image 802. Range kernel 816 is typically a window much smaller than the whole blurred image 804. For example, range kernel 816 may be 3×3 or 5×5 window. Range kernel 816 is a function of blurred image 804. Range kernel 816 approaches one when a local variation of blurred image 804 is small and range kernel 816 approaches zero when the local variation of blurred image 804 is large.

For example, a 3×3 range kernel 816 at point Q(x,y) 808 of blurred image 804 may be expressed as $$R(x, y)_{i,j} = e^{-\frac{|I(x, y) - I(x + i\Delta x, y + j\Delta y)|^2}{\sigma^2}},$$

where i=−1,0,1 and j=−1,0,1. R(x,y) is a range kernel 816 at Q(x,y) 808 of blurred image 804. I(x,y) is blurred image 804 at Q(x,y) 808, and I(x+iΔx,y+jΔy) is blurred image 804 at sampled points surrounding Q(x,y) 808 in a window. Δx and Δy are predetermined constants indicating sample intervals. σ is a constant.

R(x,y) i,j approaches one when a local variation of blurred image 804, i.e., the square of absolute value of I(x,y)−I(x+iΔx,y+jΔy), is small and range kernel 816 approaches zero when the local variation of blurred image 804, i.e., the square of absolute value of I(x,y)−I(x+iΔx,y+jΔy), is large.

In this example, the 3×3 range kernel 816 at Q(x,y) 808 of blurred image 804 may be expressed as $$R(x, y) = \begin{bmatrix} R(x,y)_{-1,-1} & R(x,y)_{0,-1} & R(x,y)_{+1,-1} \\ R(x,y)_{-1,0} & R(x,y)_{0,0} & R(x,y)_{+1,0} \\ R(x,y)_{-1,+1} & R(x,y)_{0,+1} & R(x,y)_{+1,+1} \end{bmatrix}.$$

Range kernel 816 is multiplied with a spatial kernel 810 (e.g., Gaussian function) resulting in bilateral kernel 812 (e.g., truncated Gaussian function at a point). Both spatial kernel 810 and bilateral kernel 812 may be the same window as range kernel 816, e.g., 3×3. Bilateral kernel 812 at a point P (x,y) 806 of full resolution interpolated green image 802 is a multiplication product of spatial kernel 810 and range kernel 816. The center of spatial kernel 810 is aligned with the center of range kernel 816, which corresponds to point Q(x,y) 808 of blurred image 804. Point Q(x,y) 808 of blurred image 804 is aligned with point P (x,y) 806 of full resolution interpolated green image 802 as shown in FIG. 8.

In the spatial-variant convolution between full resolution interpolated green image 802 and bilateral kernel 812, the kernel (i.e., bilateral kernel 812) is changing as point P (x,y) 806 changes or moves during the convolution. In this manner, the sharp image (in-focus portion of an interpolated green image) will not be smoothed out by bilateral kernel 812, while the defocused potion of an interpolated green image having artifacts is smoothed out by bilateral kernel 812.

Range kernel 816, spatial kernel 810, and bilateral kernel 812 are not limited to a 3×3 or 5×5 window. They include m×n windows, where m and n may be any number. Preferably, m and n are odd integers.

Figure 9:
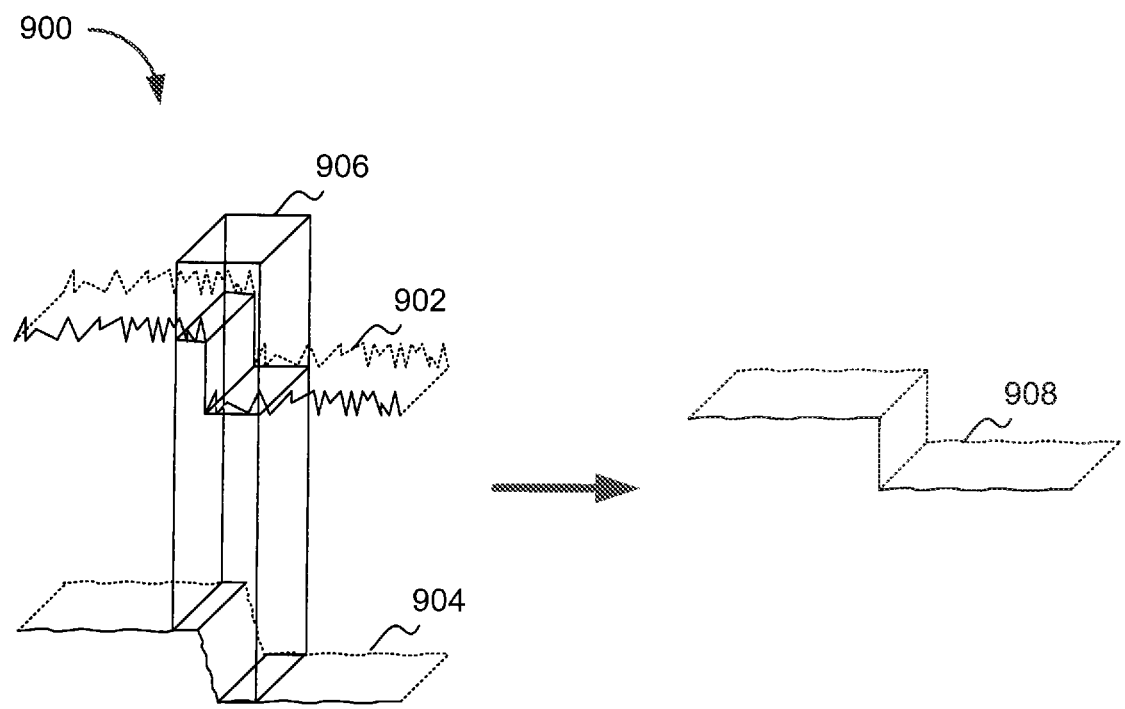
FIG. 9 shows a joint least square fitting process, in accordance with the present invention.

FIG. 9 shows a joint least square fitting process 900, which is also shown as block 714 in FIG. 7, in accordance with the present invention. Joint least square fitting of the full resolution interpolated green image with the blurred image is performed within a scanning window to obtain a corrected full resolution interpolated green image. A full resolution interpolated green image 902, which is also shown in block 708 in FIG. 7, is a target image. A blurred image 904, which is also shown as block 712 in FIG. 7, is a guide image. For example, blurred image 904 may be a low-pass filtered image of full resolution interpolated green image 902. A window 906 covers the target image (full resolution interpolated green image 902) and the guide image (blurred image 904). For example, window 906 includes 3×3 points of full resolution interpolated green image 902, which have values of T1, T2, T3, T4, T5, T6, T7, T8, T9, respectively. T stands for target. Window 906 also includes 3×3 points of blurred image 904, which have values of G1, G2, G3, G4, G5, G6, G7, G8, G9, respectively. G stand for guide. A joint least square fitting process is carried out to determine a and b that would result in a minimum value of the square of $$a \begin{bmatrix} G1 & G2 & G3 \\ G4 & G5 & G6 \\ G7 & G8 & G9 \end{bmatrix} + b - \begin{bmatrix} T1 & T2 & T3 \\ T4 & T5 & T6 \\ T7 & T8 & T9 \end{bmatrix}.$$

The above expression may be written as $a\ Gi+b-Ti,$ where Gi is the value of the i-th point of blurred image 904 within 3×3 window 906, and i is 1, 2, 3, . . . 9, and Ti is the value of the i-th point of full resolution interpolated green image 902 within 3×3 window 906, and i is 1, 2, 3, . . . 9.

After a and b are determined, a corrected full resolution interpolated green image 908 at window 906, which is also shown as block 716 in FIG. 7, is provided by $Cj=a\ Gj+b,$ where j indicates the center point of 3×3 window 906 covering points having i, which is 1, 2, 3, . . . 9, where Cj is the value of the center point of 3×3 window 906 at corrected full resolution interpolated green image 908, and where Gj is the value of the center point of 3×3 window 906 at blurred image 904. In this example, j is 5. Values of all points of corrected full resolution interpolated green image 908 can be obtained by scanning window 906.

Window 906 is not limited to including 3×3 points. It may cover mxn points of full resolution interpolated green image 902 and blurred image 904, where m and n may be any number. Preferably, m and n are odd integers. In this manner, the sharp image (in-focus portion of a full resolution interpolated green image) will not be smoothed out by the joint least square fitting process, while the defocused potion of a full resolution interpolated green image having artifacts is smoothed out by the joint least square fitting process.

While the present invention has been described herein with respect to the exemplary embodiments and the best mode for practicing the invention, it will be apparent to one of ordinary skill in the art that many modifications, improvements and sub-combinations of the various embodiments, adaptations, and variations can be made to the invention without departing from the spirit and scope thereof.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An imaging system comprising:
    a phase-detection (PD) image sensor comprising a plurality of PD pixel units, each PD pixel unit comprising a first left PD pixel and a first right PD pixel, the first left PD pixel and the first right PD pixel covered by a microlens;
    wherein the plurality of PD pixel units comprise green PD pixel units forming a green image, blue PD pixel units forming a blue image, and red PD pixel units forming a red image; and
    wherein the green image, the blue image, and red image form a color image arranged in an original Bayer pattern comprising the green PD pixel units, the blue PD pixel units, and the red PD pixel units;
    a processor configured to:
    interpolate the green image to obtain a full resolution interpolated green image including defocused portions having artifacts and in-focus portions having sharp image;
    low-pass filter the full resolution interpolated green image to obtain a blurred image of the full resolution interpolated green image;
    combine the full resolution interpolated green image and the blurred image of the full resolution interpolated green image to obtain a corrected full resolution interpolated green image;
    wherein the artifacts of the defocused portions of the full resolution interpolated green image are removed, and the sharp image of the in-focus portions of the full resolution interpolated green image is unaffected;

spatial-variant convolute the full resolution interpolated green image with a bilateral kernel, wherein the bilateral kernel is a multiplication product of a spatial kernel and a range kernel.

2. The imaging system of claim 1, wherein each PD pixel unit further comprises a second left PD pixel and a second right PD pixel, the first left PD pixel, the first right PD pixel, the second left PD pixel, and the second right PD pixel are covered by a microlens.

3. The imaging system of claim 1, wherein the spatial kernel comprises a Gaussian function.

4. The imaging system of claim 1, wherein the range kernel is a function of the blurred image, the range kernel approaches one when a local variation of the blurred image is small and the range kernel approaches zero when the local variation of the blurred image is large.

5. The imaging system of claim 1, wherein the processor is further configured to:
correct sensitivities of the green image, the blue image, and the red image prior to interpolating the green image.

6. The imaging system of claim 1, wherein the processor is further configured to:
sharpen the corrected full resolution interpolated green image after obtaining the corrected full resolution interpolated green image.

7. The imaging system of claim 1, wherein the processor is further configured to:
interpolate the blue and red images partially based on the corrected full resolution interpolated green image and partially based on the color image arranged in the original Bayer pattern; and
form a Bayer image using the interpolated blue and red images and part of the corrected full resolution interpolated green image.

8. An imaging system comprising:
a phase-detection (PD) image sensor comprising a plurality of PD pixel units, each PD pixel unit comprising a first left PD pixel and a first right PD pixel, the first left PD pixel and the first right PD pixel covered by a microlens;
wherein the plurality of PD pixel units comprise green PD pixel units forming a green image, blue PD pixel units forming a blue image, and red PD pixel units forming a red image; and
wherein the green image, the blue image, and red image form a color image arranged in an original Bayer pattern comprising the green PD pixel units, the blue PD pixel units, and the red PD pixel units;
a processor configured to:
interpolate the green image to obtain a full resolution interpolated green image including defocused portions having artifacts and in-focus portions having sharp image;
low-pass filter the full resolution interpolated green image to obtain a blurred image of the full resolution interpolated green image;
combine the full resolution interpolated green image and the blurred image of the full resolution interpolated green image to obtain a corrected full resolution interpolated green image;
wherein the artifacts of the defocused portions of the full resolution interpolated green image are removed, and the sharp image of the in-focus portions of the full resolution interpolated green image is unaffected;

perform a joint least square fitting of the full resolution interpolated green image with the blurred image within a scanning window including mxn points of the full resolution interpolated green image and the blurred image to obtain a corrected full resolution interpolated green image, wherein m and n are odd integers.

9. The imaging system of claim 8, wherein the joint least square fitting comprises determination of a and b to obtain a minimum value of a square of (aGi+b−Ti) within the scanning window, wherein Gi is a value of the blurred image and Ti is a value of the full resolution interpolated green image, and determination of the corrected full resolution interpolated green image using the determined a and b as Cj=aGj+b, wherein j indicates a center point of the scanning window and wherein Cj is a value of the corrected full resolution interpolated green image at the scanning window and Gj is a value of the blurred image at the scanning window.

10. The imaging system of claim 8, wherein each PD pixel unit further comprises a second left PD pixel and a second right PD pixel, the first left PD pixel, the first right PD pixel, the second left PD pixel, and the second right PD pixel are covered by a microlens.

11. The imaging system of claim 8, wherein the processor is further configured to:
correct sensitivities of the green image, the blue image, and the red image prior to interpolating the green image.

12. The imaging system of claim 8, wherein the processor is further configured to:
sharpen the corrected full resolution interpolated green image after obtaining the corrected full resolution interpolated green image.

13. The imaging system of claim 8, wherein the processor is further configured to:
interpolate the blue and red images partially based on the corrected full resolution interpolated green image and partially based on the color image arranged in the original Bayer pattern; and
form a Bayer image using the interpolated blue and red images and part of the corrected full resolution interpolated green image.

14. A method for remosaicing a Bayer image from a color image arranged in an original Bayer pattern comprising green pixel units, blue pixel units, and red pixel units comprising:
interpolating a green image to obtain a full resolution interpolated green image including defocused portions having artifacts and in-focus portions having sharp image;
low-pass filtering the full resolution interpolated green image to obtain a blurred image of the full resolution interpolated green image;
combining the full resolution interpolated green image and the blurred image of the full resolution interpolated green image to obtain a corrected full resolution interpolated green image;
wherein the artifacts of the defocused portions of the full resolution interpolated green image are removed, and the sharp image of the in-focus portions of the full resolution interpolated green image is unaffected;
performing a spatial-variant convolution of the full resolution interpolated green image with a bilateral kernel, wherein the bilateral kernel is a multiplication product of a spatial kernel and a range kernel.

15. The method of claim 14, where the spatial kernel comprises a Gaussian function.

16. The imaging system of claim 14, wherein the range kernel is function of the blurred image, the range kernel approaches one when a local variation of the blurred image is small and the range kernel approaches zero when the local variation of the blurred image is large.

17. The method of claim 14 further comprising:
correcting sensitivities of the green image, the blue image, and the red image prior to interpolating the green image.

18. The method of claim 14 further comprising:
sharpening the corrected full resolution interpolated green image after obtaining the corrected full resolution interpolated green image.

19. The method of claim 14 further comprising:
interpolating blue and red images partially based on the corrected full resolution interpolated green image and partially based on the color image arranged in the original Bayer pattern; and
forming the remosaiced Bayer image using the interpolated blue and red images and part of the corrected full resolution interpolated green image.

20. A method for remosaicing a Bayer image from a color image arranged in an original Bayer pattern comprising green pixel units, blue pixel units, and red pixel units comprising:
interpolating a green image to obtain a full resolution interpolated green image including defocused portions having artifacts and in-focus portions having sharp image;
low-pass filtering the full resolution interpolated green image to obtain a blurred image of the full resolution interpolated green image;
combining the full resolution interpolated green image and the blurred image of the full resolution interpolated green image to obtain a corrected full resolution interpolated green image;
wherein the artifacts of the defocused portions of the full resolution interpolated green image are removed, and the sharp image of the in-focus portions of the full resolution interpolated green image is unaffected;
performing a joint least square fitting of the full resolution interpolated green image with the blurred image within a scanning window including mxn points of the full resolution interpolated green image and the blurred image to obtain a corrected full resolution interpolated green image, wherein m and n are odd integers.

21. The method of claim 20, wherein the joint least square fitting comprises determination of a and b to obtain a minimum value of a square of (aGi+b−Ti) within the scanning window, wherein Gi is a value of the blurred image and Ti is a value of the full resolution interpolated green image, and determination of the corrected full resolution interpolated green image using the determined a and b as Cj=aGj+b, wherein j indicates a center point of the scanning window and wherein Cj is a value of the corrected full resolution interpolated green image at the scanning window and Gj is a value of the blurred image at the scanning window.

22. The method of claim 20 further comprising:
correcting sensitivities of the green image, the blue image, and the red image prior to interpolating the green image.

23. The method of claim 20 further comprising:
sharpening the corrected full resolution interpolated green image after obtaining the corrected full resolution interpolated green image.

24. The method of claim 20 further comprising:
interpolating blue and red images partially based on the corrected full resolution interpolated green image and partially based on the color image arranged in the original Bayer pattern; and
forming the remosaiced Bayer image using the interpolated blue and red images and part of the corrected full resolution interpolated green image.

25. An imaging system comprising:
a plurality of green pixel units, a microlens covering each unit and each unit having four pixels;
a plurality of blue pixel units, a microlens covering each unit and each unit having four pixels;
a plurality of red pixel units, a microlens covering each unit and each unit having four pixels;
wherein the plurality of green pixel units form a green image, the plurality of blue pixel units form a blue image, and the plurality of red pixel units form a red image; and
wherein the green image, the blue image, and red image form a color image arranged in an original Bayer pattern comprising the green pixel units, the blue pixel units, and the red pixel units;
a processor configured to:
interpolate the green image to obtain a full resolution interpolated green image including defocused portions having artifacts and in-focus portions having sharp image;
low-pass filter the full resolution interpolated green image to obtain a blurred image of the full resolution interpolated green image;
combine the full resolution interpolated green image and the blurred image of the full resolution interpolated green image to obtain a corrected full resolution interpolated green image;
wherein the artifacts of the defocused portions of the full resolution interpolated green image are removed, and the sharp image of the in-focus portions of the full resolution interpolated green image is unaffected;
spatial-variant convolute the full resolution interpolated green image with a bilateral kernel, wherein the bilateral kernel is a multiplication product of a spatial kernel and a range kernel.

26. An imaging system comprising:
a plurality of green pixel units, a microlens covering each unit and each unit having four pixels;
a plurality of blue pixel units, a microlens covering each unit and each unit having four pixels;
a plurality of red pixel units, a microlens covering each unit and each unit having four pixels;
wherein the plurality of green pixel units form a green image, the plurality of blue pixel units form a blue image, and the plurality of red pixel units form a red image; and
wherein the green image, the blue image, and red image form a color image arranged in an original Bayer pattern comprising the green pixel units, the blue pixel units, and the red pixel units;
a processor configured to:
interpolate the green image to obtain a full resolution interpolated green image including defocused portions having artifacts and in-focus portions having sharp image;
low-pass filter the full resolution interpolated green image to obtain a blurred image of the full resolution interpolated green image;

combine the full resolution interpolated green image and the blurred image of the full resolution interpolated green image to obtain a corrected full resolution interpolated green image;

wherein the artifacts of the defocused portions of the full resolution interpolated green image are removed, and the sharp image of the in-focus portions of the full resolution interpolated green image is unaffected;

perform a joint least square fitting of the full resolution interpolated green image with the blurred image within a scanning window including mxn points of the full resolution interpolated green image and the blurred image to obtain a corrected full resolution interpolated green image, wherein m and n are odd integers.

* * * * *